United States Patent [19]

Ohm et al.

[11] Patent Number: 5,391,621
[45] Date of Patent: Feb. 21, 1995

[54] 1,3,4-THIADIAZOLE CURING SYSTEMS FOR CHLORINE CONTAINING POLYMERS

[75] Inventors: Robert F. Ohm, Monroe; David M. Hoffman, Norwalk; Ralph A. Annicelli, Ansonia, all of Conn.

[73] Assignee: R. T. Vanderbilt Company, Inc., Norwalk, Conn.

[21] Appl. No.: 136,152

[22] Filed: Oct. 15, 1993

[51] Int. Cl.⁶ .......................... C08K 5/47; C08K 5/46; C08L 15/02; C08L 11/00
[52] U.S. Cl. ..................... 525/160; 525/187; 525/194; 525/330.9; 525/333.9; 525/346; 525/349; 525/403; 525/406
[58] Field of Search ............ 525/160, 164, 187, 194, 525/330.9, 333.9, 346, 349, 403, 406

[56] References Cited

U.S. PATENT DOCUMENTS

| | | | |
|---|---|---|---|
| 2,541,550 | 2/1951 | Sarbach | 525/215 |
| 2,719,125 | 9/1955 | Roberts | 253/46.71 |
| 2,719,126 | 9/1955 | Fields et al. | 252/47 |
| 2,983,716 | 5/1961 | Fields | 525/349 |
| 3,087,932 | 4/1963 | Little | 260/302 |
| 3,609,079 | 9/1971 | Devine | 252/46.3 |
| 4,128,510 | 12/1978 | Richwine | 528/36 |
| 4,288,576 | 9/1981 | Richwine | 525/349 |
| 4,551,505 | 11/1985 | Sauerbier | 525/333.9 |
| 4,745,147 | 5/1988 | Honsberg | 524/386 |
| 4,978,703 | 12/1990 | Answorth et al. | 524/298 |
| 4,978,716 | 12/1990 | Flynn et al. | 525/195 |
| 5,250,625 | 10/1993 | Ehrend | 525/182 |

*Primary Examiner*—David Buttner
*Attorney, Agent, or Firm*—Rasma B. Balodis

[57] ABSTRACT

The present invention provides an improved curing system for chlorinated polymers and blends thereof with more highly unsaturated eleastomers, using an organopolysulfide derivative of 2,5-dimercapto-1,3,4-thiadiazole as a curing agent.

10 Claims, No Drawings

1,3,4-THIADIAZOLE CURING SYSTEMS FOR CHLORINE CONTAINING POLYMERS

BACKGROUND OF THE INVENTION

The present invention relates to curing systems based on polysulfide derivatives of 1,3,4-thiadiazole and their use in curing chlorine-containing polymers.

In the past, chlorine-containing polymers have been compounded with curatives and other ingredients for vulcanization into vulcanizates for use in various industrial and consumer applications. Many known curing accelerators, however, are highly active at relatively low temperatures and consequently may cause premature vulcanization or scorching. This phenomenon my lead to unsatisfactory physical properties of the vulcanizate.

One type of accelerators based on 2,5-dimercapto-1,3,4-thiadiazole is disclosed in U.S. Pat. No. 4,128,510.

A disadvantage of known 1,3,4-thiadiazole curing agents is poor bin storage stability. That is, the viscosity tends to increase during storage of the chlorinated polymer compounded with the thiadiazole based curative. The increased viscosity requires tedious process control, as for example frequent adjustment of machine settings.

Surprisingly, it has been discovered that certain organopolysulfide derivatives of 1,3,4-thiadiazole are effective curing agents for chlorinated polymers and furthermore, display excellent bin storage stability when compounded with the polymer.

SUMMARY OF THE INVENTION

In accordance with the invention, there is provided an improved curing system for chlorinated polymer compositions.

The curable compositions comprise a mixture of saturated and unsaturated chlorine containing polymers and a polysulfide derivative of 1,3,4-thiadiazole or mixtures of such derivatives having the formula

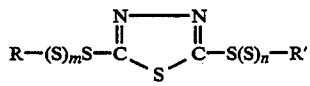
(I)

wherein R and R' are the same or different organic radicals containing from 2 to 30 carbon atoms, m and n are numbers from 1 to about 8, the sum of m and n being at least 2.

Another aspect of the invention relates to a process of crosslinking saturated and unsaturated chlorine containing polymers with a polysulfide derivative of 1,3,4-thiadiazole or mixtures of such derivatives having the formula (I) and in the presence of an organic amine.

DETAILED DESCRIPTION OF THE INVENTION

The organopolysulfide derivatives of 2,5-dimercapto-1,3,4-thiadiazole useful as curing agents or curing accelerators in accordance with the present invention may be liquid or waxy solid materials depending on the nature of the substituent R and R' groups. The more preferred derivatives are those having the formula

wherein R and R' are the same or different aliphatic, cycloalphatic or aromatic hydrocarbon radicals, including alkyl, aralkyl, aryl and alkaryl radicals, as well as mixtures thereof, and m and n are as described above. The acyclic radicals may contain from 2 to about 30 carbon atoms, more preferably from about 4 to about 16 carbon atoms. Examples of suitable hydrocarbon radicals include linear or branched alkyl radicals such as ethyl, propyl, butyl, isobutyl, hexyl, octyl, nonyl, decyl, dodecyl, tridecyl, octadecyl and the like, as well as cyclic radicals such as cyclohexyl, phenyl, tolyl, benzyl, styryl naphthyl and the like. In the preferred embodiment of the invention, R and R' are the same alkyl groups and each contain from 4 to about 16 carbon atoms.

In the more preferred embodiment, m and n are identical integers ranging from 2 to about 6 such that the sum of m and n ranges from 4 to about 12. In the most preferred embodiment of the invention $m=n=2$ or 3, and both R and R' are $C_6$ to $C_{10}$ alkyl. Most preferably $m=n=2$.

The compounds are not novel per se. The compounds within the scope of this formula are described in U.S. Pat. Nos. 2,719,125 and 2,719,126 to be useful as corrosion inhibiting additives for lubricants. They are also disclosed in U.S. Pat. No. 3,609,079 as additives for silicone-based oils to enhance the lubrication properties of the oil.

Bis-disulfide derivatives of the invention can be prepared by reacting 2,5-dimercapto-1,3,4-thiadiazole with a suitable sulfenyl chloride, or by reacting the dimercaptan with chlorine and then reacting the resultant disulfenyl chloride with a primary or tertiary mercaptan. An alternative preparation method is disclosed in U.S. Pat. No. 3,087,932. Bis-trisulfide derivatives are obtained by reacting the dimercaptan with a mercaptan and a sulfur chloride in molar ratios of from 1:2:2 to 1:2:4 at a temperature of from about 50° to 100° C. Higher polysulfides can be prepared by reacting the thiadiazole di- or trisulfides with sulfur at temperatures of about 93° to 204° C. Another method of preparing the polysulfides of the present invention involves reacting 2,5-dimercapto-1,3,4-thiadiazole with a mercaptan and sulfur in the molar ratio of from 1:1:1 to 1:4:16 at temperatures of from about 75° C. to about 150° C.

Some of the methods actually yield mixtures of polysulfides. This is particularly the case wherein the polysulfide derivatives are prepared by sulfurization of 2,5-dimercapto-1,3,4-thiadiazoles as confirmed by high performance liquid chromatography (HPLC). A more comprehensive disclosure of these compounds and their method of synthesis is found in U.S. Pat. No. 2,719,126, the complete disclosure of which is incorporated herein by reference.

Any saturated or unsaturated chlorine containing polymer containing at least one percent and preferably about five percent by weight of chlorine may be crosslinked in accordance with the invention. The chlorine content may range up to 40 percent based on the weight of the polymer. Typical of the chlorine containing polymers are, among others, homopolymers of epichlorohydrin, copolymers of epichlorohydrin and ethylene oxide or propylene oxide, polychloroprene, chlorinated polyolefins, chlorosulfonated polyolefin, polychloroalkylacrylates and chlorobutyl rubber. The polymers are well known and available commercially.

The chlorine containing polymers may be blended with non-halogen containing polymers provided there is sufficient chlorine content present to effect crosslinking. The blends can include natural rubber, polybutadiene, polyolefins, copolymers of butadiene with styrene (SBR) or acrylonitrile (NBR), copolymers of ethylene-propylene-diene (EPDM), butyl rubber and the like. Such blends may contain from about 10 to about 90% by weight of each type of polymer, more preferably from about 25 to 75% by weight, based on the polymer content of the blend. The most preferred blends are those containing the chlorinated polymer at levels of from about 25 to 75% by weight.

The organopolysulfides of this invention may be incorporated into the polymer composition in their pure form or they may be mixed with one or more liquid diluents. They may also be absorbed onto the surface of finely divided, inert carrier to provide a powdered product.

Suitable diluents include aromatic, naphthenic and paraffinic hydrocarbon oil; alkyl esters of dibasic acids, e.g., dioctyl phthalate, dioctyl sebacate, dioctyl adipate, diisodecyl glutarate, dioctyl azolate; alkyl sulfides; fatty acid esters, e.g., butyl oleate, butyl stearate, octyl epoxy tallate, trioctyl trimellitate; polyester plasticizers, e.g. polymeric di(butoxy-ethoxy-ethyl) adipate, polymer of bis(ethyleneoxy)methane with disulfide linkages; petroleum sulfonates; alkyl trimellitates; and polymeric esters.

Suitable finely divided carrier materials include carbon black, metal oxides, such as aluminum oxide; alumina; silica; mineral fillers such as clay, talc and bentonite; aluminosilicates; zeolites and similar carriers. The most preferred carriers are non-basic since basic carriers such as calcium silicate can have an adverse influence on curing properties.

Preferred carriers have a surface area of from about 75 to about 300 m$^2$/g. A particularly preferred carrier is amorphous silica available from Pittsburgh Plate Glass Company under the trade name HISIL®233 and HISIL ABS.

When mixed with a liquid diluent or finely divided carrier, the mixing ratios may vary between about 15 to 85% by weight the organopolysulfide with the balance being the diluent or carrier. Preferred mixing ratios lie in the range of 30 to 70% by weight.

The amount of the organopolysulfide active ingredient effective to cure the chlorinated polymer composition will vary as a function of the chlorine content of the elastomer. Generally, it is employed in the range of from about 0.1 to about 6.0 parts by weight per 100 parts by weight of chlorinated polymer present in the curable composition, more preferably in the range of about 0.25 to about 3.0 parts by weight per 100 parts by weight of chlorinated elastomer. Where the organopolysulfide is diluted or combined with a finely divided carrier, higher levels of the resulting material may be used to provide the required level of active ingredient.

The organopolysulfides are preferably used as co-curatives in curing systems containing other curative accelerators.

In case of polymers having relatively unreactive chlorine substituent, it is preferable to use an accelerator of the aliphatic or aromatic amine type. Suitable accelerators, among others, include the reaction product of butyraldehyde and aniline, available commercially under the trade name VANAX®808 from R. T. Vanderbilt Company, Inc., fatty amines, and quaternary ammonium salts, such as tetrabutylammonium bromide and tetraethylammonium chloride.

For curing blends of chlorinated and non-chlorinated polymers, sulfur or other well known sulfur-containing curatives for unsaturated elastomers may be included in the composition.

Examples of such compounds are sulfur, benzothiazyl disulfide, N-oxydiethylene benzothiazole-2-sulfenamide, 2-mercaptobenzothiazole, alkyl phenol disulfides, tetraalkylthiuram disulfide, m-phenylenebismaleimide, N,N'-diarylguanidines, and like known materials.

Other additives that may be desirable for crosslinking with the polysulfide derivatives include basic metal oxides, metal hydroxides and metal salts of carboxylic acids. Typical additives include zinc oxide, magnesium oxide, zinc stearate and sodium acetate.

In addition to the curatives, the polymer composition may include antioxidants as for example octylated diphenylamine, diphenyl-p-phenylenediamine and styrenated phenol type antioxidants.

The vulcanizable compositions may also contain other conventional additives known in the art, including fillers such as carbon black or silica, stabilizers, plasticizers, processing oils, pigments, flame retardants, and like additives known in the art.

The vulcanizable composition may be prepared and blended using any suitable mixing device such as a two-roll mill, an internal mixer (Brabender Plasticorder), a Banbury Mixer, a kneader or a similar mixing device. The processing and vulcanization techniques are well known in the art.

The following examples are given to further illustrate the invention. All percentages and parts are based on weight unless otherwise indicated.

EXAMPLE I

A reactor was charged with 2,5-bis(octyldithio)-1,3,4-thiadiazole (17.5 g), di-n-octyl disulfide (7.5 g) and sulfur (2.55 g). The reaction mixture was heated at 130° C. for two hours. The product was a yellow liquid. The percent of conversion to the 2,5-bis(octyltrithio)-1,3,4-thiadiazole derivative was estimated to be 30–40 percent based on HPLC analysis.

The reaction product was mixed with 30% by weight amorphous silica to form curative A.

EXAMPLE II

Vulcanizate compositions 1 and 2 were prepared by compounding a chloropolyethylene polymer with curative A and other compounding ingredients as indicated in Table 1. The vulcanizates contained a supplemented accelerator.

The vulcanizates were press cured at 171° C. for 30 minutes. The physical properties of the vulcanizates were evaluated by the following test methods: Torque and scorch time by ASTM D2084, Mooney parameters by ASTM D1646 using a small rotor (MS), physical properties by ASTM D412 and D2250 and compression set by ASTM D395, Method B.

The results indicate the superior physical and storage characteristics of vulcanizates cured with the curatives of the invention. Moreover, the vulcanizates after aging had a smooth and dry appearance.

TABLE 1

| Ingredients | Vulcanizates, parts by weight | |
|---|---|---|
| | 1 | 2 |
| Chlorinated polyethylene | 100.0 | 100.0 |
| Carbon black | 50.0 | 50.0 |
| Process oil[1] | 30.0 | 30.0 |
| Magnesium oxide | 10.0 | 10.0 |
| Curative A | 10.0 | 10.0 |
| Accelerator[2] | 0.8 | — |
| Accelerator[3] | — | 1.2 |
| Physical Properties | | |
| Press cured 30 min. at 171° C. | | |
| 200% Modulus, psi | 920 | 920 |
| Tensile strength, psi | 2170 | 2880 |
| Elongation, percent | 510 | 500 |
| Hardness, Shore A | 73 | 73 |
| Rheometer at 171° C. | | |
| Minimum torque, in.-lb. | 8.5 | 6.8 |
| Maximum torque, in.-lb. | 48.1 | 88.3 |
| Scorch time (ts3), min. | 2.2 | 2.4 |
| Cure time, (tc 90) min. | 26.0 | 25.8 |
| Compression Set after 70 hours at 100° C. | | |
| Set, percent | 27.9 | 18.1 |
| Mooney at 121° C. | | |
| Viscosity, MS | 22.7 | 21.2 |
| Scorch (t3, min.) | 14.2 | 19.9 |
| Bin stability after 2 weeks @ 38° C., Mooney at 121° C. | | |
| Viscosity, MS | 28.2 | 23.1 |
| Change in viscosity, percent | +24 | +9 |

[1]Sundex ® 790 manufactured by Sun Oil Co.
[2]VANAX ® 808, Aniline-butyraldehyde reaction product manufactured by R. T. Vanderbilt Company, Inc.
[3]Armeen ® 2HT, bis(hydrogenated tallow alkyl) amines manufactured by Akzo Chemie America.

EXAMPLE III

Vulcanizate compositions 3 and 4 were prepared by compounding neoprene W polymer with curative A and B. Curative B contained 70% 2,5-bis(n-octyldithio)-1,3,4-thiadiazole in a diluent.

The vulcanizates were press cured at 160° C. for 20 min. The physical properties were evaluated according to the test methods described in example II.

The results compiled in Table 2 demonstrate the improved physical and storage characteristics of vulcanizates cured with the curative of the invention.

The above embodiments have shown various aspects of the present invention. Other variations will be evident to those skilled in the art and such modifications are intended to be within the scope of the invention as defined by the appended claims.

TABLE 2

| Ingredients | Vulcanizates, parts by weight | |
|---|---|---|
| | 3 | 4 |
| Neoprene W | 100.0 | 100.0 |
| Stearic acid | 0.5 | 0.5 |
| Magnesium oxide | 5.4 | 5.4 |
| Plasticizer[4] | 5.0 | 5.0 |
| Octylated diphenylamine | 2.0 | 2.0 |
| Carbon black | 75.0 | 75.0 |
| Zinc oxide | 5.0 | 5.0 |
| Curative B | 6.3 | — |
| Curative A | — | 10 |
| Physical Properties | | |
| Press cured 20 min. at 160° C. | | |
| 200% Modulus, psi | 272 | 718 |
| Tensile strength, psi | 1694 | 1788 |
| Elongation, percent | 731 | 509 |
| Hardness, Shore A | 47 | 62 |
| Rheometer at 160° C. | | |
| Minimum torque, in.-lb. | 6 | 7.0 |
| Maximum torque, in.-lb. | 31 | 83.0 |
| Scorch time (ts2), min. | 7 | 2.5 |
| Compression set after 22 hours at 100° C. | | |
| Set, percent | 62.5 | 34.5 |
| Mooney at 121° C. | | |
| Viscosity, MS | 12.4 | 14.0 |
| Scorch (t3), min. | 59 | 18.6 |
| Bin stability after 2 weeks at 38° C., Mooney at 121° C. | | |
| Viscosity, MS | 14.5 | 17.5 |
| Change in viscosity, percent | +17 | +25 |

[4]VANPLAST ® PL, sodium petroleum sulfonate distributed by R. T. Vanderbilt Company, Inc.

What is claimed is:

1. A curable composition comprising (1) polymers consisting of at least one chlorinated polymer selected from the group consisting of chlorinated butyl rubber, homopolymers of epichlorohydrin, copolymers of epichlorohydrin and ethylene oxide or propylene oxide, polychloroprene, chlorinated polyolefins, chlorosulfonated polyolefin and mixtures thereof, and an organopolysulfide derivative of 2,5-dimercapto-1,3,4-thiadiazole or mixtures of such derivatives having the formula:

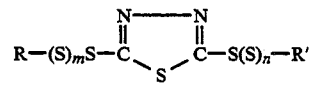

wherein R and R' are the same or different organic radicals containing from 2 to about 30 carbon atoms and m and n are numbers of from 1 to about 8, the sum of m and n being at least 2, said organopolysulfide being present in said composition in an amount effective to cure said composition upon the application of heat.

2. The composition of claim 1 wherein said organopolysulfide is present in said composition at a level in the range from about 0.1 to about 6 parts by weight per 100 parts by weight of said chlorinated polymer.

3. The composition of claim 1 wherein said organopolysulfide is present in said composition absorbed on the surface of an inert carrier material.

4. The composition of claim 1 wherein R and R' are alkyl groups each containing from 4 to about 16 carbon atoms.

5. The composition of claim 1 wherein m=n=2 or 3.

6. The composition of claim 2 which further contains magnesium oxide in an amount effective to co-cure said composition.

7. The composition of claim 2 which further contains condensation product of 3 moles butyraldehyde and 1 moles aniline in an amount effective to accelerate the cure of said composition.

8. The composition of claim 2 which further contains fatty amine in an amount effective to accelerate the cure of said composition.

9. The composition of claim 2 which further contains tallow alkyl amine in an amount effective to accelerate the cure of said composition.

10. A curable composition comprising a mixture of (1) a chlorinated polymer selected from the group consisting of chlorinated butyl rubber, homopolymers of epichlorohydrin, copolymers of epichlorohydrin and ethylene oxide or propylene oxide, polychloroprene, chlorinated polyolefins, chlorosulfonated polyolefin and mixtures thereof, (2) an organopolysulfide derivative of 2,5-dimercapto-1,3,4-thiadiazole or mixtures of such derivatives having the formula

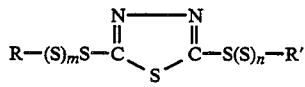

wherein R and R' are the same or different organic radicals containing from 2 to about 30 carbon atoms and m and n are numbers of from 1 to about 8, the sum of m and n being at least 2, said organopolysulfide being present in said composition in an amount ranging from about 0.1 to about 6 parts by weight of said chlorinated polymer, and (3) an accelerator selected from the group of a condensation product of butyraldehyde and aniline, fatty amine and tallow alkyl amine in an amount effective to accelerate the cure of said composition upon the application of heat.

* * * * *

UNITED STATES PATENT AND TRADEMARK OFFICE
CERTIFICATE OF CORRECTION

PATENT NO. : 5,391,621
DATED : February 21, 1995
INVENTOR(S) : Robert F. Ohm et al It is certified that error appears in the above-identified patent and that said Letters Patent is hereby corrected as shown below:

In The Claims

Col. 6, line 58

"moles aniline" should be --mole aniline--;

Col. 8, line 4

"all least" should be --at least--.

Signed and Sealed this

Sixteenth Day of May, 1995

Attest:

BRUCE LEHMAN

*Attesting Officer*  *Commissioner of Patents and Trademarks*